US012679595B2

(12) United States Patent
Kastanek

(10) Patent No.: US 12,679,595 B2
(45) Date of Patent: Jul. 14, 2026

(54) CONTAINER WITH DENESTING FEATURES

(71) Applicant: Graphic Packaging International, LLC, Atlanta, GA (US)

(72) Inventor: Raymond S. Kastanek, Mead, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/782,240

(22) Filed: Jul. 24, 2024

(65) Prior Publication Data

US 2025/0033831 A1 Jan. 30, 2025

Related U.S. Application Data

(60) Provisional application No. 63/528,704, filed on Jul. 25, 2023.

(51) Int. Cl.
*B65D 21/02* (2006.01)
*B31B 50/26* (2017.01)
(Continued)

(52) U.S. Cl.
CPC ........ *B65D 21/0233* (2013.01); *B31B 50/262* (2017.08); *B31B 50/81* (2017.08);
(Continued)

(58) Field of Classification Search
CPC .... B65D 21/0233; B65D 5/2038; B65D 5/56; B65D 5/2047; B65D 5/2085; B65D 5/563;
(Continued)

(56) References Cited

U.S. PATENT DOCUMENTS 2,110,681 A 3/1938 Rutledge
2,663,449 A 12/1953 Smart
(Continued)

FOREIGN PATENT DOCUMENTS

CA 2814149 A1 4/2012
CA 3212489 A1 9/2022
(Continued)

OTHER PUBLICATIONS

International Search Report and Written Opinion for PCT/US2024/039240 dated Nov. 18, 2024.
(Continued)

*Primary Examiner* — Christopher R Demeree
(74) *Attorney, Agent, or Firm* — Andrew N. Claerbout; FisherBroyles, LLP

(57) ABSTRACT

According to one aspect, the disclosure is generally directed to a container for holding a food product, the container has a flange including a central panel extending at least partially around a central opening, a sidewall extending at least partially around an interior of the container, the sidewall including a plurality of panels foldably connected to the central panel, at least one corner flap foldably connected to a respective panel of the plurality of panels, the at least one corner flap obliquely arranged relative to the respective panel of the plurality of panels, and denesting features including a denesting lug extending from the at least one corner flap and outwardly from the sidewall, the denesting lug positioned for engaging a nested container positioned below the container in a stacked arrangement and for forming a denesting gap between the flange and the nested container.

37 Claims, 10 Drawing Sheets

(51) Int. Cl.
*B31B 50/81* (2017.01)
*B31B 100/00* (2017.01)
*B31B 110/30* (2017.01)
*B31B 120/40* (2017.01)
*B65D 5/20* (2006.01)
*B65D 5/56* (2006.01)

(52) U.S. Cl.
CPC ............ *B65D 5/2038* (2013.01); *B65D 5/56* (2013.01); *B31B 2100/00* (2017.08); *B31B 2110/30* (2017.08); *B31B 2120/402* (2017.08)

(58) Field of Classification Search
CPC .... B65D 5/0015; B65D 5/20; B65D 81/3453; B65D 5/4266; B65D 21/0212; B65D 5/242; B65D 5/243; B65D 77/046; B65D 81/3216
USPC ............... 229/164.2, 114, 116, 169; D9/456; 206/518, 519; 220/657, 62.13
See application file for complete search history.

(56) References Cited

U.S. PATENT DOCUMENTS 3,104,012 A 9/1963 Beamish
3,154,215 A 10/1964 Le Vesconte
3,358,900 A 12/1967 Perdue
3,489,331 A 1/1970 Andersson
3,536,248 A * 10/1970 Vilho .................... B65D 5/242 229/116
D219,263 S 11/1970 Castelli
3,575,338 A 4/1971 Dilot
3,640,188 A 2/1972 Dilot
D224,662 S 8/1972 Swett
D232,302 S 8/1974 Lazure
3,863,832 A 2/1975 Gordon
3,893,882 A 7/1975 Repenning
3,941,301 A 3/1976 Jorgensen
4,046,310 A 9/1977 Gustafsson
4,057,380 A 11/1977 Hosoe
4,081,125 A 3/1978 Meyers
4,130,236 A 12/1978 Manizza
D251,951 S 5/1979 Florian
4,177,715 A 12/1979 Meyers
4,202,465 A 5/1980 McLaren
D257,109 S 9/1980 Conti
4,241,863 A 12/1980 Faller
4,257,530 A 3/1981 Faller
4,279,354 A 7/1981 Conti
4,283,427 A 8/1981 Winters
4,305,542 A 12/1981 Benzschawel
4,308,985 A 1/1982 Manizza
4,325,905 A 4/1982 Takahashi
4,351,473 A 9/1982 Manizza
4,533,065 A 8/1985 Chazal
4,555,381 A 11/1985 Chazal
4,574,174 A 3/1986 McGonigle
D284,727 S 7/1986 Gerber
4,718,596 A 1/1988 Mueller
D302,068 S 7/1989 Forbes, Jr.
4,848,648 A 7/1989 Eisman
4,903,842 A 2/1990 Tokuda
4,943,456 A 7/1990 Pollart
4,944,451 A 7/1990 Forbes, Jr.
5,000,374 A 3/1991 Deiger
5,002,826 A 3/1991 Pollart
5,002,833 A 3/1991 Kinsey, Jr.
5,009,939 A 4/1991 Goldberg
5,118,747 A 6/1992 Pollart
D332,393 S 1/1993 Boone
5,203,491 A 4/1993 Marx
5,253,801 A 10/1993 Bernstein
5,326,021 A 7/1994 Farrell
5,351,879 A 10/1994 Liu
5,356,070 A 10/1994 Rigby
5,410,135 A 4/1995 Pollart
5,412,187 A 5/1995 Walters
D363,192 S 10/1995 Reeves
D367,172 S 2/1996 Brightbill
5,530,231 A 6/1996 Walters
D372,170 S 7/1996 Ahern, Jr.
5,533,622 A 7/1996 Stockley, III
5,533,623 A 7/1996 Fischer
5,538,179 A 7/1996 Cai
5,588,583 A 12/1996 Cargile, Jr.
5,647,168 A 7/1997 Gilbert
D420,855 S 2/2000 Hurley
6,092,687 A 7/2000 Hupp
6,116,501 A 9/2000 Hupp
6,204,492 B1 3/2001 Zeng
6,234,386 B1 5/2001 Drummond
D448,130 S 9/2001 Wagner
6,433,322 B2 8/2002 Zeng
6,552,315 B2 4/2003 Zeng
D484,364 S 12/2003 Bailey
6,677,563 B2 1/2004 Lai
D549,457 S 8/2007 Dretzka
D595,155 S 6/2009 Larson
D633,341 S 3/2011 Smyers
D643,311 S 8/2011 Meyers
D656,789 S 4/2012 Locke
D658,933 S 5/2012 Woodard
D688,572 S 8/2013 Marin
D688,921 S 9/2013 Miros
8,534,460 B2 9/2013 Wnek
D693,180 S 11/2013 Peterson
8,801,995 B2 8/2014 Wnek
D712,153 S 9/2014 Lee
D713,741 S 9/2014 Wilmers
9,718,576 B2 8/2017 Moore
9,783,345 B2 10/2017 Bentham
D897,847 S 10/2020 Glassman
11,034,498 B2 6/2021 Mondini
D962,008 S 8/2022 Moore
11,427,374 B2 8/2022 Mondini
D970,977 S 11/2022 Glupker
D1,004,431 S * 11/2023 Kastanek ....................... D9/456
D1,042,116 S 9/2024 Holley, Jr.
D1,042,117 S 9/2024 Hithersay
D1,042,118 S * 9/2024 Hithersay ...................... D9/456
D1,042,119 S 9/2024 Brink
D1,042,120 S 9/2024 Kearns
D1,042,121 S 9/2024 Brink
D1,042,122 S 9/2024 Brink
D1,044,494 S 10/2024 Hithersay
D1,062,459 S * 2/2025 Brink ............................. D9/456
12,312,144 B2 5/2025 Hoefte
12,351,370 B2 7/2025 Tye
12,371,225 B2 * 7/2025 Suokas ................ B65D 5/2033
12,378,033 B2 8/2025 Nowak
12,391,456 B2 8/2025 Tye
2005/0031814 A1 2/2005 Dawes
2007/0116806 A1 5/2007 Parsons
2007/0262487 A1 11/2007 O'Hagan
2008/0035634 A1 2/2008 Zeng
2011/0174676 A1 7/2011 Stockhaus
2011/0259784 A1 10/2011 Tye
2012/0248180 A1 10/2012 White
2013/0327821 A1 12/2013 Zwaga
2014/0124406 A1 5/2014 Ishikawa
2014/0183198 A1 7/2014 Slack
2014/0224866 A1 8/2014 Littlejohn
2015/0225120 A1 8/2015 Wnek
2015/0375889 A1 12/2015 Brockman
2017/0341355 A1 11/2017 Peiffer
2018/0022529 A1 1/2018 Tye
2018/0319568 A1 11/2018 Tye
2020/0047940 A1 2/2020 Tye
2020/0047975 A1 2/2020 Tye
2020/0255200 A1 8/2020 Mondini
2021/0053714 A1 2/2021 Zwaga
2022/0055789 A1 2/2022 Mero
2022/0289459 A1 9/2022 Kastanek

(56) References Cited

U.S. PATENT DOCUMENTS

| | | | |
|---|---|---|---|
| 2022/0348376 A1 | 11/2022 | Tye et al. |
| 2023/0072635 A1 | 3/2023 | Tye |
| 2024/0400252 A1 | 12/2024 | Hoefte |
| 2024/0400253 A1 | 12/2024 | Hoefte |

FOREIGN PATENT DOCUMENTS

| | | | |
|---|---|---|---|
| CN | 203450620 | U | 2/2014 |
| CN | 119013194 | A | 11/2024 |
| CN | 120152908 | A | 6/2025 |
| DE | 10022552 | | 11/2001 |
| DE | 202022106312 | U1 | 11/2022 |
| DE | 202022101343 | U1 | 9/2023 |
| DE | 202024105015 | U1 | 9/2024 |
| DE | 202024105786 | U1 | 11/2024 |
| EM | 0090908480001 | | 8/2022 |
| EM | 0090908480002 | | 8/2022 |
| EP | 0 671 332 | A1 | 9/1995 |
| EP | 1104744 | A2 | 6/2001 |
| EP | 3939897 | A1 | 1/2022 |
| EP | 4101777 | A1 | 12/2022 |
| EP | 4173981 | A1 | 5/2023 |
| EP | 4366942 | A1 | 5/2024 |
| EP | 4368529 | A1 | 5/2024 |
| EP | 4545432 | A1 | 4/2025 |
| EP | 4570474 | A1 | 6/2025 |
| EP | 4585411 | A1 | 7/2025 |
| ES | 2932148 | A1 | 1/2023 |
| FI | 130517 | B | 10/2023 |
| FR | 2133727 | | 12/1972 |
| FR | 2406522 | | 5/1979 |
| FR | 2826938 | | 1/2003 |
| FR | 2933329 | | 1/2010 |
| FR | 3124171 | B1 | 10/2023 |
| FR | 3133183 | B1 | 2/2024 |
| FR | 3137669 | B1 | 8/2024 |
| GB | 1314148 | | 4/1973 |
| GB | 1501764 | | 2/1978 |
| GB | 1602625 | | 11/1981 |
| GB | 2487765 | A | 8/2012 |
| GB | 2550386 | A | 11/2017 |
| GB | 2617133 | A | 10/2023 |
| IT | 202000002992 | A1 | 8/2021 |
| IT | 202000008272 | A1 | 10/2021 |
| JP | 05-294333 | A | 11/1993 |
| JP | H0642636 | | 2/1994 |
| JP | 2000141511 | A | 5/2000 |
| JP | 2000190948 | A | 7/2000 |
| JP | 2001002056 | A | 1/2001 |
| JP | 2001233322 | A | 8/2001 |
| JP | 2001233324 | A | 8/2001 |
| JP | 2001278246 | A | 10/2001 |
| JP | 2002347746 | A | 12/2002 |
| JP | 2006298395 | A | 11/2006 |
| JP | 2023035470 | A | 3/2023 |
| JP | 7543738 | B2 | 9/2024 |
| KR | 101539187 | B1 | 7/2015 |
| KR | 200490800 | Y1 | 1/2020 |
| KR | 102589800 | B1 | 10/2023 |
| KR | 20250006262 | A | 1/2025 |
| PL | 131234 | U1 | 8/2024 |
| PL | 131235 | U1 | 8/2024 |
| PL | 443691 | A1 | 8/2024 |
| PL | 73710 | Y1 | 12/2024 |
| TW | M295475 | U | 8/2006 |
| TW | M301016 | U | 11/2006 |
| WO | 2003041945 | | 5/2003 |
| WO | 2007127371 | | 11/2007 |
| WO | 2009138786 | | 11/2009 |
| WO | 2012049005 | A1 | 4/2012 |
| WO | 2013002639 | | 1/2013 |
| WO | 2014032059 | A1 | 2/2014 |
| WO | 2014066867 | A1 | 5/2014 |
| WO | 2015009518 | | 1/2015 |
| WO | 2018017783 | A1 | 1/2018 |
| WO | 2018178508 | A1 | 10/2018 |
| WO | 2019020863 | | 1/2019 |
| WO | 2019092323 | A1 | 5/2019 |
| WO | 2019094057 | A1 | 5/2019 |
| WO | 2020033350 | | 2/2020 |
| WO | 2020033352 | | 2/2020 |
| WO | 2021161243 | A1 | 8/2021 |
| WO | 2021186764 | A1 | 9/2021 |
| WO | 2021209610 | A1 | 10/2021 |
| WO | 2023283491 | A1 | 1/2023 |
| WO | 2023158119 | A1 | 8/2023 |
| WO | 2024100164 | A1 | 5/2024 |
| WO | 2024249015 | A2 | 12/2024 |
| WO | 2025024494 | A1 | 1/2025 |

OTHER PUBLICATIONS

Compartment K&K Paper Tray 2100mi, available Apr. 28, 2023, [online], [site visited Apr. 28, 2023]. Available from internet, URL: https://goodwillretail.co.th/ehop/2-compartment-kk-paper-tray-2100ml/ (Year: 2023) 1 page.

PaperSeal Original Tray, available Apr. 28, 2023, [online], [site visited Apr. 28, 2023]. Available from internet, URL: https://www.graphicpkg.com/products/paperseal-original/ (Year: 2023), 5 pages.

* cited by examiner

CONTAINER WITH DENESTING FEATURES

CROSS-REFERENCE TO RELATED APPLICATION

The present application claims the benefit of and priority to U.S. Provisional Patent Application No. 63/528,704, filed on Jul. 25, 2023.

INCORPORATION BY REFERENCE

The disclosures of U.S. Provisional Patent Application No. 63/528,704, filed on Jul. 25, 2023, U.S. patent application Ser. No. 18/140,695, filed Apr. 28, 2023, U.S. Provisional Application 63/338,250, filed May 4, 2022, U.S. patent application Ser. No. 17/867,856, filed Jul. 19, 2022, U.S. Provisional Application 63/338,250, filed May 4, 2022, U.S. Provisional Application 63/336,623 filed Apr. 29, 2022, U.S. patent application Ser. No. 16/532,819 filed Aug. 6, 2019, U.S. patent application Ser. No. 16/532,823 filed Aug. 6, 2019, U.S. Provisional Patent Application No. 62/851,932, filed May 23, 2019, U.S. Provisional Patent Application No. 62/796,716, filed Jan. 25, 2019, U.S. Provisional Patent Application No. 62/715,520, filed Aug. 7, 2018, U.S. patent application Ser. No. 16/037,425, filed Jul. 17, 2018, U.S. Provisional Patent Application No. 62/649,159, filed Mar. 28, 2018, U.S. Provisional Patent Application No. 62/643,914, filed Mar. 16, 2018, U.S. patent application Ser. No. 15/654,814, filed Jul. 20, 2017, U.S. Provisional Patent Application No. 62/365,635, filed Jul. 22, 2016, and U.S. patent application Ser. No. 12/992,131, filed Feb. 11, 2011, PCT Patent Application No. PCT/GB/09/50506, filed May 13, 2009, are hereby incorporated by reference for all purposes as if presented herein in their entirety.

BACKGROUND OF THE DISCLOSURE

The present disclosure relates to blanks, containers, trays, constructs, and various features and methods for forming a container from a blank. More specifically, the disclosure is generally directed to a stackable container and/or a stack of containers having denesting features.

SUMMARY OF THE DISCLOSURE

According to one aspect, the disclosure is generally directed to a container for holding a food product, the container comprising a flange comprising a central panel extending at least partially around a central opening, a sidewall extending at least partially around an interior of the container, the sidewall comprising a plurality of panels foldably connected to the central panel, at least one corner flap foldably connected to a respective panel of the plurality of panels, the at least one corner flap obliquely arranged relative to the respective panel of the plurality of panels, and denesting features comprising a denesting lug extending from the at least one corner flap and outwardly from the sidewall, the denesting lug positioned for engaging a nested container positioned below the container in a stacked arrangement and for forming a denesting gap between the flange and the nested container.

According to another aspect, the disclosure is generally directed to a blank for forming a container for holding a food product, the blank comprising a central panel extending at least partially around a central opening for at least partially forming a flange of the container formed from the blank, a plurality of panels foldably connected to the central panel for at least partially forming a sidewall extending at least partially around an interior of the container formed from the blank, at least one corner flap foldably connected to a respective panel of the plurality of panels, the at least one corner flap for being obliquely arranged relative to the respective panel of the plurality of panels when the container is formed from the blank, and denesting features comprising a denesting lug extending from the at least one corner flap, the denesting lug for being positioned extending outwardly from the sidewall for engaging a nested container positioned below the container formed from the blank in a stacked arrangement and for forming a denesting gap between the flange and the nested container when the container is formed from the blank.

According to another aspect, the disclosure is generally directed to a method of forming a container for holding a food product, the container comprising obtaining a blank comprising a central panel extending at least partially around a central opening, a plurality of panels foldably connected to the central panel, the blank further comprising at least one corner flap foldably connected to a respective panel of the plurality of panels, and denesting features comprising a denesting lug extending from the at least one corner flap, positioning the central panel to at least partially form a flange, positioning the plurality of panels extending at least partially around an interior of the container, and positioning the at least one corner flap extending outwardly from the sidewall for engaging a nested container positioned below the container in a stacked arrangement and for forming a denesting gap between the flange and the nested container.

According to another aspect, the disclosure is generally directed to a stacked arrangement of containers for holding a food product, the stacked arrangement comprising a lower nested container at least partially receiving an upper nested container, the upper nested container comprising a flange comprising a central panel extending at least partially around a central opening, a sidewall extending at least partially around an interior of the container, the sidewall comprising a plurality of panels foldably connected to the central panel, at least one corner flap foldably connected to a respective panel of the plurality of panels, the at least one corner flap obliquely arranged relative to the respective panel of the plurality of panels; and denesting features comprising a denesting lug extending from the at least one corner flap and outwardly from the sidewall, the denesting lug positioned for engaging the lower nested container positioned below the upper nested container in a stacked arrangement and for forming a denesting gap between the flange and the lower nested container.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure relates generally to various aspects of containers, constructs, trays, materials, packages, elements, and articles, and methods of making such containers, constructs, trays, materials, packages, elements, and articles. Although several different aspects, implementations, and embodiments are disclosed, numerous interrelationships between, combinations thereof, and modifications of the various aspects, implementations, and embodiments are contemplated hereby. In one illustrated embodiment, the present disclosure relates to forming a container or tray for holding food items or various other articles. However, in other embodiments, the container or tray can be used to form other non-food containing articles and/or may be used for heating or cooking.

Figure 1:
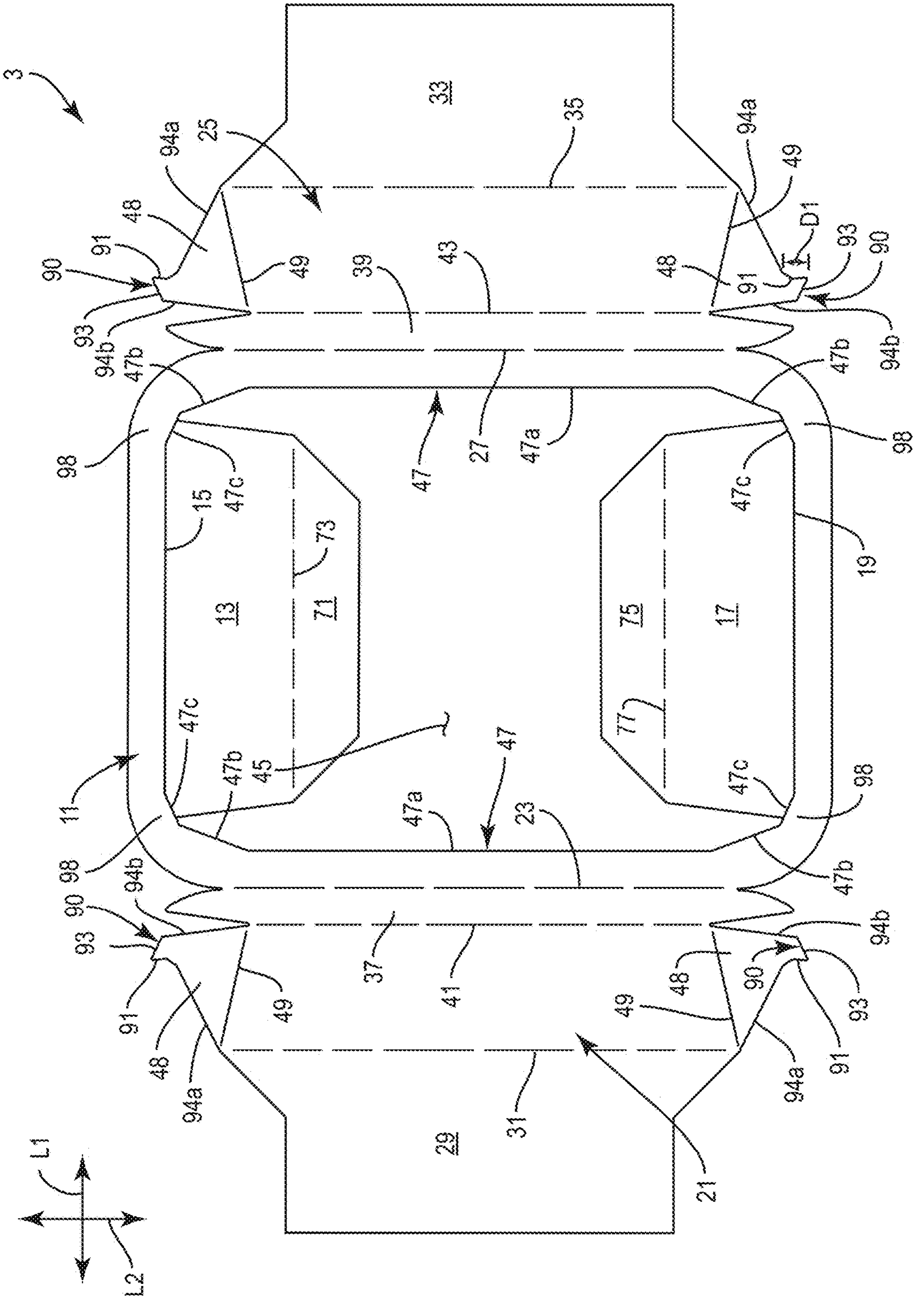
FIG. 1 is a plan view of a blank used for forming a container according to a first exemplary embodiment of the disclosure.

FIG. 1 illustrates a blank 3 that is used to form a base layer 7 of a container 5 (FIGS. 2-6), wherein the container 5 includes a liner 9 (schematically shown in FIG. 2) attached to the base layer 7 according to embodiments of the disclosure. In one embodiment, the base layer comprises paperboard (e.g., solid bleached sulphate folding boxboard), or other suitable material that can be recyclable and/or suitable for use in an oven (not shown), and the liner 9 comprises a plastic layer such as polyethylene, a polyethylene terephthalate (PET) material, or any other thermoplastic material, or a bioplastic, such as vegetable oil or starch-based plastics.

In an exemplary embodiment, the liner 9 comprises polyethylene that can be softened and fused to the base layer 7. In an alternative embodiment, the liner 9 can comprise PET or a similar material that is at least partially attached to the base layer 7 by a heat seal layer (e.g., a thermoformable sealant grade transparent polyester packaging film, such as Mylar® XMPOL12 available from DuPont Teijin Films U.S. Limited Partnership of Hopewell, Virginia, or any suitable thermoformable sealant or adhesive, any suitable heat or pressure activated adhesive, or any other suitable material), wherein a PET liner can be more suitable for uses that require heating of the container in an oven. In the illustrated embodiments, the liner 9 is at least partially attached to the base layer 7 and is in contact with the food product held in the container 5 (e.g., during heating).

In exemplary embodiments, after heating the food product, the base layer 7 and the liner 9 can be separated to allow both the base layer 7 and the liner 9 to be recycled separately (e.g., see the incorporated-by-reference patent applications).

The blank 3 can be formed from a single ply of material, such as but not limited to paperboard, cardboard, paper, a polymeric sheet, and/or a laminate that includes more than one layer. In one embodiment, the blank 3 can include a microwave interactive layer (not shown) such as is common in MicroRite® containers available from Graphic Packaging International of Atlanta, GA. The microwave interactive layer can be commonly referred to as, or can have as one of its components, a susceptor, a foil, a microwave shield, or any other term or component that refers to a layer of material suitable for shielding microwave energy and/or causing heating in a microwave oven.

As shown in FIG. 1, the blank 3 has a longitudinal direction L1 and a lateral direction L2. In the illustrated embodiment, the blank 3 has a central panel 11, a first end panel 13 foldably connected to the central panel 11 at a longitudinal fold line 15, a second end panel 17 foldably connected to the central panel 11 at a longitudinal fold line 19, a first side panel 21 foldably connected to the central panel 11 at a lateral fold line 23, and a second side panel 25 foldably connected to the central panel 11 at a lateral fold line 27.

In the illustrated embodiment, the blank 3 further comprises a first bottom panel 29 foldably connected to the first side panel 21 along a lateral fold line 31, a second bottom panel 33 foldably connected to the second side panel 25 along a lateral fold line 35, a third bottom panel 71 foldably connected to the first end panel 13 along a longitudinal fold line 73, and a fourth bottom panel 75 foldably connected to the second end panel 17 along a longitudinal fold line 77.

As shown in FIG. 1, the side panels 21, 25 include respective attachment portions 37, 39 at least partially defined by respective fold lines 41, 43 in the respective side panels 21, 25. In the illustrated embodiment, the end panels 13, 17 are foldably connected to the central panel 11 so that the end panels 13, 17 and the third and fourth bottom panels 71, 75 extend into a central cutout or opening 45 so that edges of the central panel 11, the end panels 13, 17, and the third and fourth bottom panels 71, 75 extend at least partially around the cutout 45 in the blank 3.

In one embodiment, the central panel 11 includes two interior free edges 47 at least partially defining the cutout 45, each having a respective central segment or portion 47*a* extending in the lateral direction L2, two corner segments or portions 47*b* extending obliquely from the respective ends of the respective central portion 47*a*, and two end segments or portions 47*c* extending obliquely from the respective ends of the corner portions 47*b* to the respective ends of the longitudinal fold lines 15, 19. In embodiments, at least a portion of the end portions 47*c* can be defined by respective cut lines where the end panels 13, 17 are separable from the central panel 11 adjacent the ends of the longitudinal fold lines 15, 19.

As shown in FIG. 1, the side panels 21, 25 are foldably connected to the central panel 11 along fold lines 23, 27 that are spaced apart from the cutout 45 and the edges 47. In the illustrated embodiment, two corner flaps 48 are foldably connected to each of the side panels 21, 25 along respective oblique fold lines 49. In embodiments, the corner flaps 48 can be considered to be parts of the respective side panels 21, 25.

As shown in FIG. 1, the blank 3 can include denesting features including a spacer or lug or shoulder 90 extending outwardly from an edge of each of the corner flaps 48 proximate the respective attachment portions 37, 39. In the illustrated embodiments, each shoulder 90 can include an engagement edge 91 extending from an oblique edge 94*a* of the respective corner flap 48 and an end edge 93 extending from the engagement edge 91 to a top edge 94*b* of the respective corner flap 48. In some embodiments, the engagement edge 91 can include at least one straight segment intersecting at least one oblique segment.

As shown in FIG. 1, the top edges 94*b* of the corner flaps 48 are spaced apart from the respective attachment portions 37, 39 of the side panels 21, 25. Alternatively, the corner flaps 48 can be separable from the respective attachment portions 37, 39 along respective cuts or tear lines or the corner flaps 48 could be foldably connected to the respective attachment portions 37, 39 along respective fold lines. In embodiments, each of the engagement edges 91 can form a flange engagement edge with a length D1 (FIG. 1) from the respective oblique edges 94*a* of the corner flaps 48.

As shown in FIG. 1, the denesting features further can include a plurality of landing areas 98 of the central panel 11 (e.g., four landing areas), extending along the respective end segments 47*c* of the edges 47. In embodiments, the central panel 11 is wider at the landing areas 98 (e.g., adjacent the ends of the longitudinal fold lines 15, 19) to provide larger areas for receiving (engaging) respective shoulders 90 of another container (e.g., a nested container) stacked on top of the container 5 as described in more detail below. The denesting features, including the shoulders 90 and the landing areas 98, could be otherwise shaped, arranged, positioned, and/or configured without departing from the disclosure.

As shown in FIG. 1, each of the first and second bottom panels 29, 33 has two longitudinal edges extending from a lateral edge and two oblique edges extending from the respective longitudinal edges and each of the third and fourth bottom panels 71, 75 has two oblique edges extending from a longitudinal edge.

In exemplary embodiments, the bottom panels 29, 33, 71, 75 are sized and configured so that the lateral edges of the first and second bottom panels 29, 33 abut one another, the longitudinal edges of the third and fourth bottom panels 71, 75 abut the longitudinal edges of the first and second bottom panels 29, 33, and the oblique edges of the third and fourth bottom panels 71, 75 abut the oblique edges of the first and second bottom panels 29, 33 when the container 5 is formed and the bottom panels 29, 33, 71, 75 are arranged to form a bottom wall. In embodiments, this configuration of the bottom panels can result in a bottom wall that is at least partially flat (e.g., all the bottom panels extending in one plane). In alternative embodiments, one or more of the bottom panels can be configured to be in an overlapping relationship with one or more of the other bottom panels.

The blank 3 could be otherwise shaped, arranged, and/or configured without departing from the disclosure. In addition, any of the central panel 11, the end panels 13, 17, the side panels 21, 25, the bottom panels 29, 33, 71, 75, and/or the corner flaps 48 could be omitted or could be otherwise shaped, arranged, positioned, and/or configured without departing from the disclosure. For example, the blank 3 could have any suitable number of panels and any suitable shape.

Figure 1B:
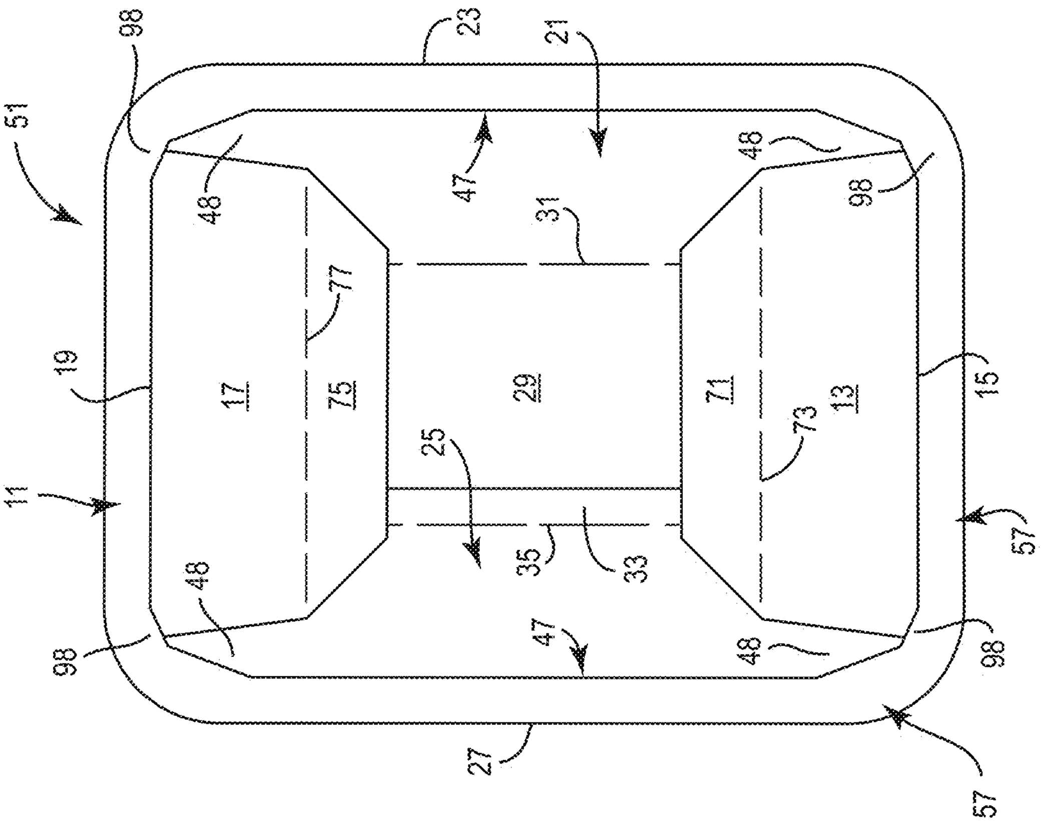
FIGS. 1A and 1B are plan views of a flat construct formed from the blank of FIG. 1 according to the first exemplary embodiment of the disclosure.
Figure 1A:
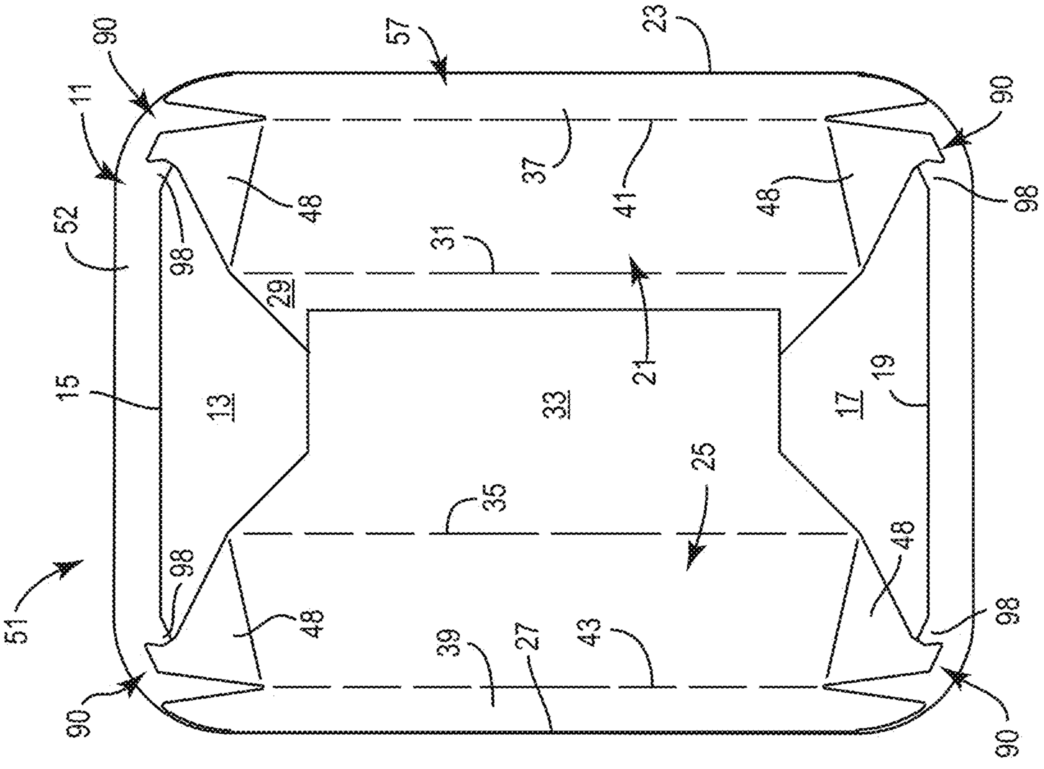

As shown in FIGS. 1A and 1B, the blank 3 can be formed into a flat construct 51 (e.g., a folded and glued blank), which is prepared to be formed into the base portion 7 of the container 5 as described in more detail below. The construct 51 can be formed by applying adhesive (e.g., in the form of glue strips) to the attachment portions 37, 39 of the side panels 21, 25 and/or to the central panel 11 and folding the side panels 21, 25 along the respective fold lines 23, 27 over the central panel 11.

The attachment portions 37, 39 can be folded into face-to-face contact with an undersurface 52 of the central panel 11 so that the attachment portions 37, 39 are adhered to the central panel 11 (FIG. 1A). In the illustrated embodiment, the attachment portions 37, 39 extend from the respective fold lines 23, 27 to the respective edges 47 of the central panel 11. As shown in FIGS. 1A and 1B, the first and second bottom panels 29, 33 can at least partially overlap one another in the construct 51, and the side panels 21, 25 and the first and second bottom panels 29, 33 can be in an at least partially overlapping relationship with the end panels 13, 17 and the third and fourth bottom panels 71, 75 in the construct 51. The construct 51 could be otherwise formed without departing from the disclosure.

As shown in FIGS. 1A and 1B, the construct 51 can lie substantially flat for compact storage and/or transportation while being in a configuration that is prepared to form the container 5. In the illustrated embodiment, the container 5 can be formed from the flat construct 51 by folding the end panel 13, 17 downwardly relative to the central panel 11 along the respective fold lines 15, 19 and folding side portions of the side panels 21, 25 downwardly relative to the central panel 11 and the attachment portions 37, 39 along the respective fold lines 41, 43.

Figure 2:
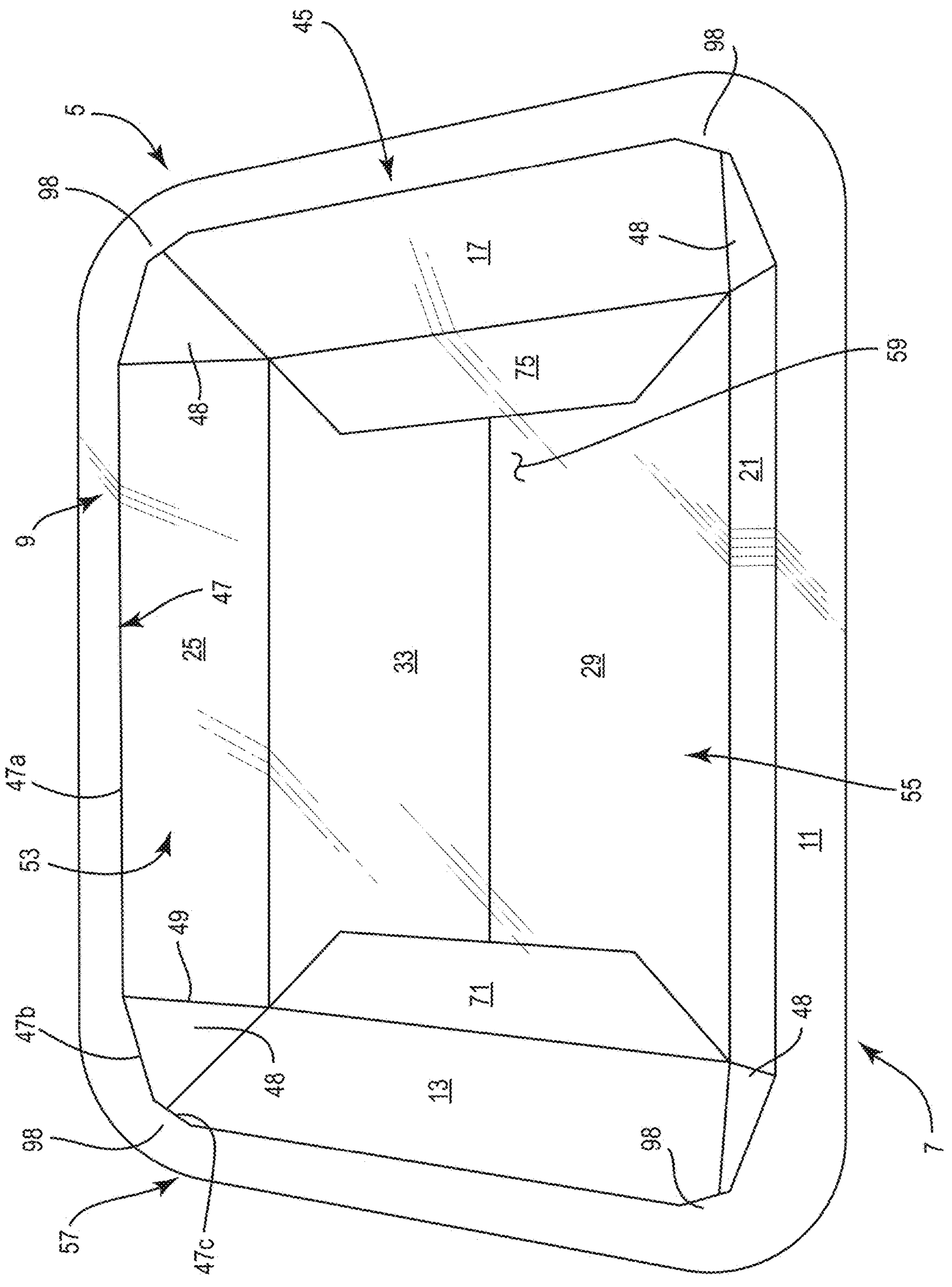
FIG. 2 is a top perspective view of the container formed from the construct of FIGS. 1A and 1B and a liner according to the first exemplary embodiment of the disclosure.
Figure 3:
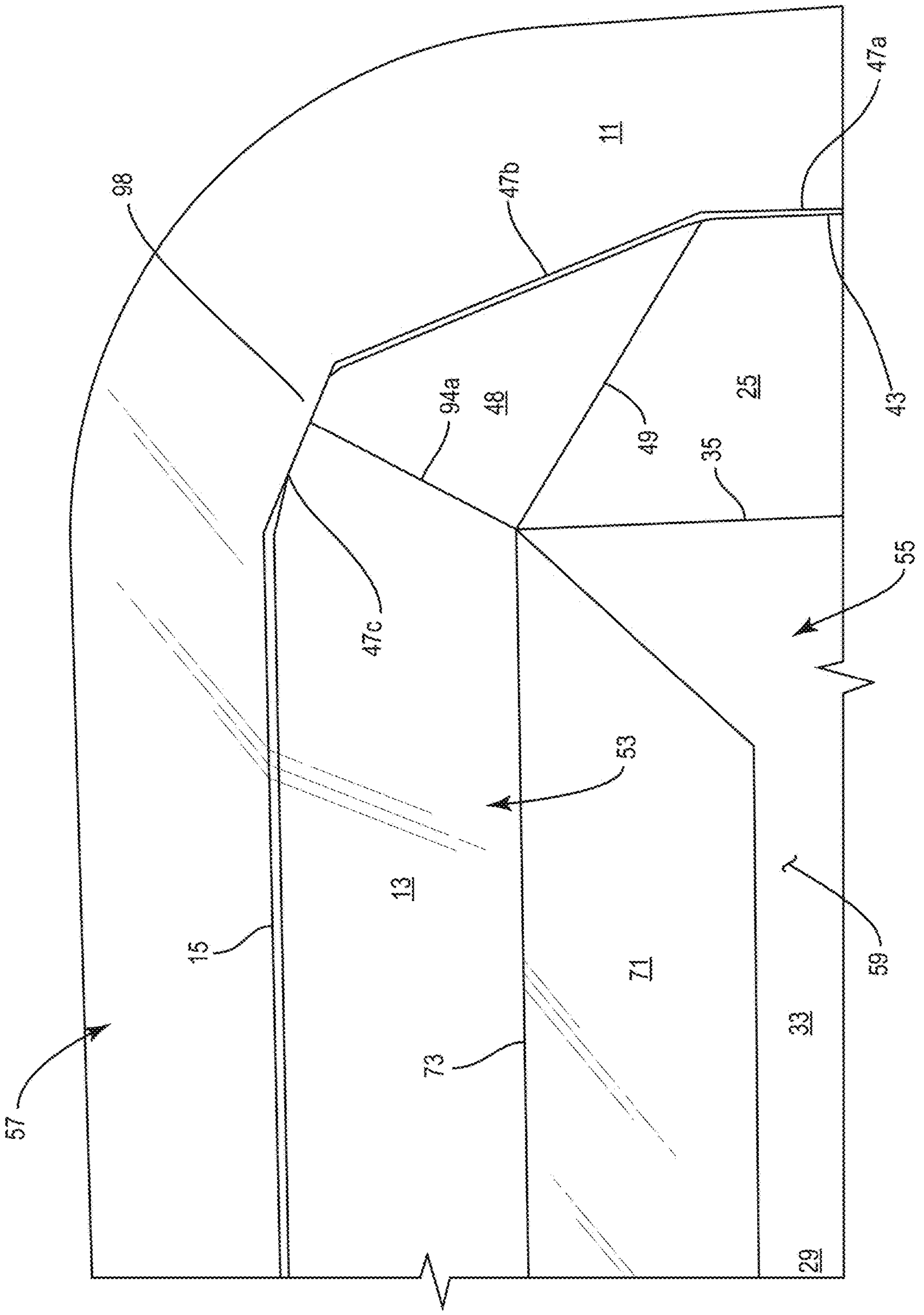
FIG. 3 is a detail view of a corner of the container of FIG. 2.
Figure 4:
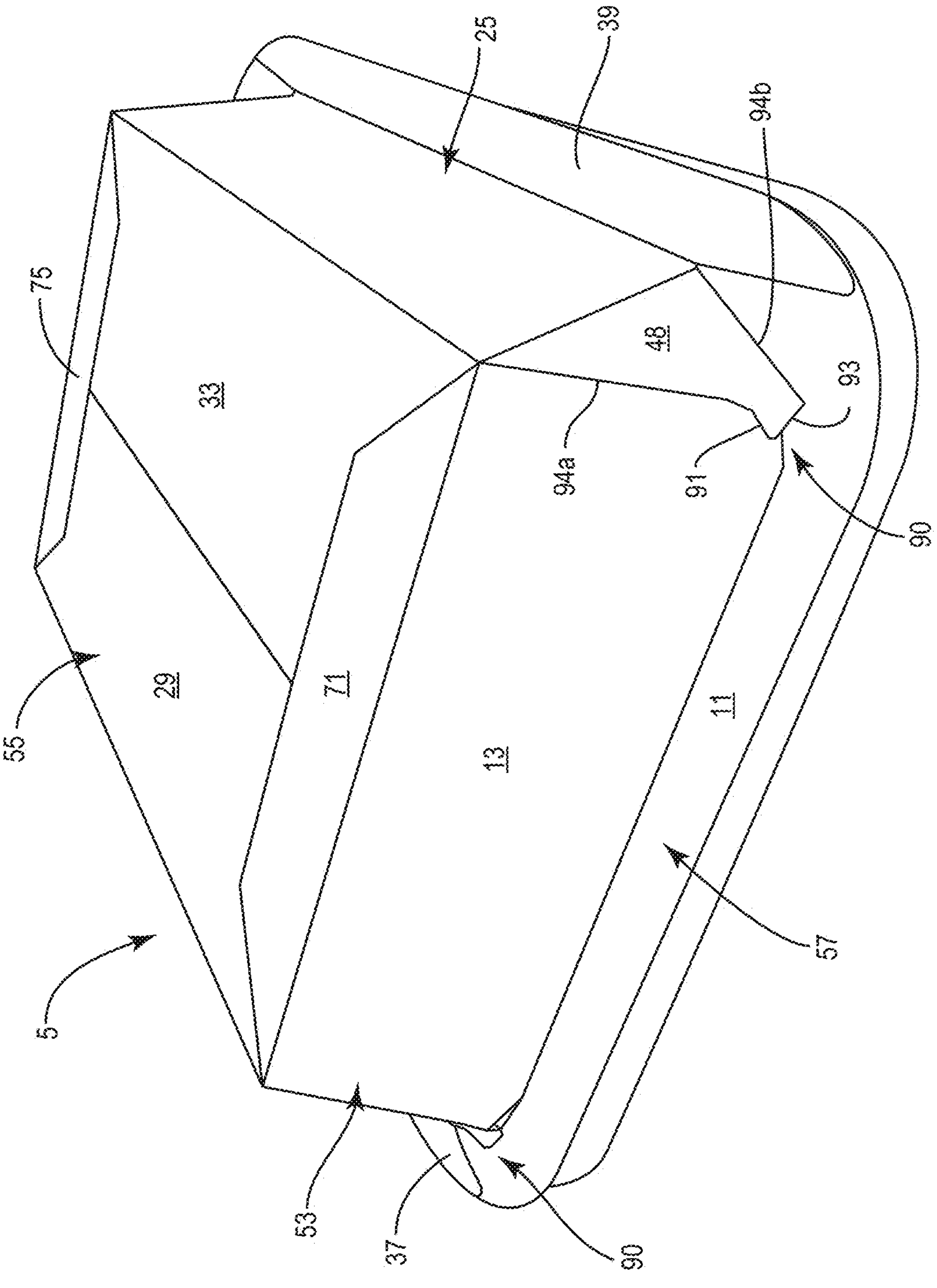
FIG. 4 is a perspective view of stacked arrangements of the containers according to the first exemplary embodiment of the disclosure.

As shown in FIGS. 2 and 3, the end panels 13, 17 and the side portions of the side panels 21, 25 extend generally downwardly from the central panel 11 to at least partially form a sidewall 53 extending around a perimeter of a bottom wall 55 formed from the bottom panels 29, 33, 71, 75 that are foldably connected to the respective panels 21, 25, 13, 17 that form the respective sidewall 53. In the illustrated embodiment, the corner flaps 48 cooperate with the side portions of the side panels 21, 25 and the end panels 13, 17 to form the sidewall 53. In embodiments, the corner flaps 48 are folded to extend between the end panels 13, 17 and the side portions of the side panels 21, 25 (e.g., with the oblique edge 94*a* of each corner flap 48 abutting a respective edge of the respective end panels 13, 17). In the illustrated embodiments, the end panels 13, 17, the side panels 21, 25, and the corner flaps 48 can extend obliquely (e.g., upwardly and outwardly) from the bottom wall 55.

As shown in FIGS. 2-6, the bottom panels 29, 33, 71, 75 can be folded along the respective fold lines 31, 35, 73, 77 with respect to the respective side panels 29, 33 and end panels 13, 17 to form the bottom wall 55 (e.g., while the sidewall 53 is formed). In the illustrated embodiments, the corner flaps 48 can be oblique with respect to the end panels 13, 17 and the side panels 21, 25. In exemplary embodiments, the edges of the bottom panels 29, 33, 71, 75 can be brought together for example such that the lateral edges of the first and second bottom panels 29, 33 abut one another, the longitudinal edges of the third and fourth bottom panels 71, 75 abut the longitudinal edges of the first and second bottom panels 29, 33, and the oblique edges of the third and fourth bottom panels 71, 75 abut the oblique edges of the first and second bottom panels 29, 33 so that the bottom panels 29, 33, 71, 75 are planar or at least partially planar and the bottom wall 55 is flat or at least partially flat.

In the illustrated embodiments, the central panel 11 and the attachment portions 37, 39 can form a flange 57 of the container 5. In exemplary embodiments, the attachment portions 37, 39 glued to the underside of the central panel 11 can strengthen the flange 57 and strengthen and increase rigidity of the container 5. The sidewall 53, the bottom wall 55, and/or the flange 57 could be omitted or could be otherwise shaped, arranged, positioned, and/or configured without departing from the disclosure. For example, one or more of the bottom panels can be configured to be in an overlapping relationship with one or more of the other bottom panels. Also, the container 5 can have one or more reinforcing features that can reinforce the flange 57 and/or other portions of the container without departing from the disclosure.

As schematically shown in FIG. 2, the container 5 further includes the liner 9 attached to the inner surface of the base layer 7 formed from the blank 3. In embodiments, the liner 9 (e.g., for a polyethylene liner) can be separably attached to the base layer 7 (e.g., by heating the liner and fusing it to the base layer). Alternatively, the liner 9 can be attached to the base layer 7 by a heat seal layer (e.g., for a PET liner), an adhesive, or other suitable features. The liner 9 can extend over the sidewall 53, the bottom wall 55, and the flange 57. In embodiments, the liner 9 can extend beyond the flange 57, the edges of the liner 9 and the flange 57 can be aligned, and/or the liner can be spaced inwardly from the edge of the flange 57. In the illustrated embodiments, the liner 9 can be attached to at least a portion of each of the bottom panels 29, 33, 71, 75, the end panels 13, 17, the side panels 21, 25, the corner flaps 48, and the central panel 11. In exemplary embodiments, the liner 9 can at least partially retain the base layer 7 in the shape of the container 5 (e.g., can help retain the end panels 13, 17, the side panels 21, 25, and the corner flaps 48 in their respective positions in the sidewall 53 and/or can help retain the bottom panels 29, 33, 71, 75 in position in the bottom wall 55, e.g., with abutting edges). The container 5, including the liner 9 and/or the base layer 7, could be otherwise shaped, arranged, positioned, and/or configured without departing from the disclosure.

In embodiments, heat and pressure used to apply the liner 9 to the construct can cause the flat construct 51 (FIGS. 1A and 1B) to be erected into the base layer 7 of the container 5 (FIGS. 2-6). For example, the end panels 13, 17 and the side portions of the side panels 21, 25 can fold downwardly with respect to the central panel 11 to form the sidewall 53 and the bottom panels 29, 33, 71, 75 can move into position to form the bottom wall 55, such as by moving the end panels 13, 17, the side portions of the side panels 21, 25, the corner flaps 48, and the bottom panels 29, 33, 71, 75 against the interior of a mold (not shown) or other suitable feature. In embodiments, the sidewall 53 and the bottom wall 55 can extend along an interior 59 of the base layer 7. The liner 9 can be forced into the interior 59 into contact with the end panels 15, 17, the side panels 21, 25, the corner flaps 48, the bottom panels 29, 33, 71, 75, and the central panel 11 (the flange 57) so that the liner 9 is at least partially adhered to the panels 15, 17, 21, 25, 29, 33, 11 and the corner flaps 48 and so that the liner 9 is combined with the base layer 7 to form the container 5.

In embodiments, the container 5 can be formed similarly to the formation of the containers as shown and described in the incorporated-by-reference applications. The container 5 could be otherwise formed without departing from the disclosure. For example, the container 5 could be formed from the construct 51 prior to applying the liner 9.

In embodiments, a lid (not shown) can comprise packaging film that is a thin plastic layer used to preserve and protect a food item contained in the tray and can be removably attached to the flange 57 of the container 5. Any plastic film, such as polyethylene, polypropylene, polyethylene terephthalate, polyvinylchloride, polyamide, and ethylene vinyl alcohol, or other suitable material, can be used for forming the lid that is sealed against the sealing surface of the flange 57. Further, adhesives can be used between the lid and the sealing surface of the flange 57 without departing from the disclosure. In embodiments, the sealing surface of the flange 57 comprises an upper surface of the central panel 11, which is generally free from joints, creases, folds, pleats, edges, and other features that can make scaling a lidding film to the flange more difficult (e.g., that can reduce the smoothness of the flange).

For example, the flange 57 can comprise one piece of board (e.g., the central panel 11) that has a top surface that extends around the perimeter of the container. Accordingly, the upper surface of the central panel 11 in the container 5 of the illustrated embodiment can provide a superior sealing surface than a container that has features such as pleats or joints on its upper flange surface. In embodiments, the arrangement of the end panels 13, 17, which are foldably connected along the cutout 45 of the central panel 11, and the side panels 21, 25, which are foldably connected along the outer edges of the central panel 11 and folded under the central panel, can allow the upper surface of the central panel 11 to be flat and/or smooth for forming the sealing surface. In embodiments, the smooth upper surface of the central panel 11 also can facilitate better attachment between the base layer 7 and the liner 9 at the upper surface of the flange 57.

Figure 5:
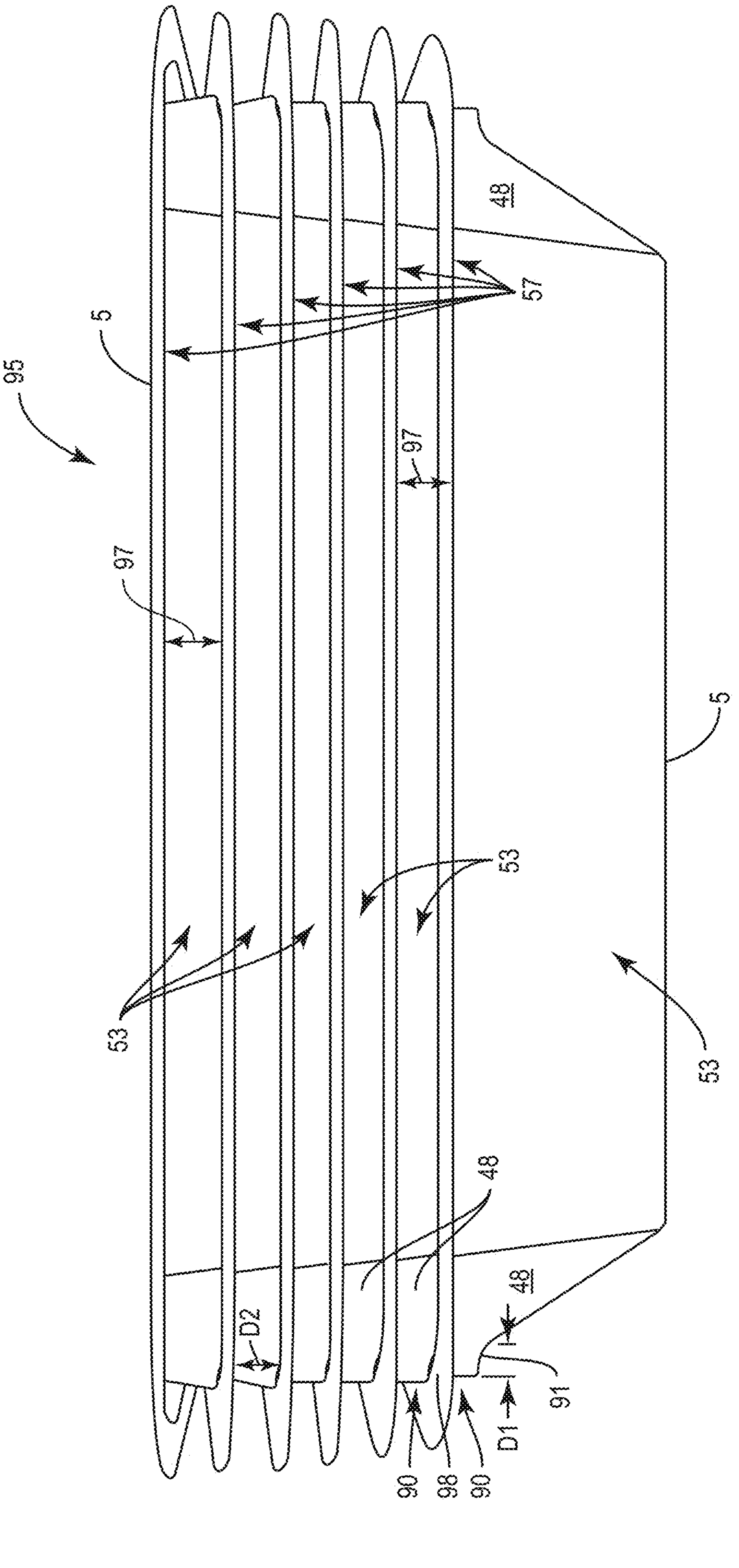
FIG. 5 is a side elevation view of stacked arrangements of the containers according to the first exemplary embodiment of the disclosure.
Figure 6:
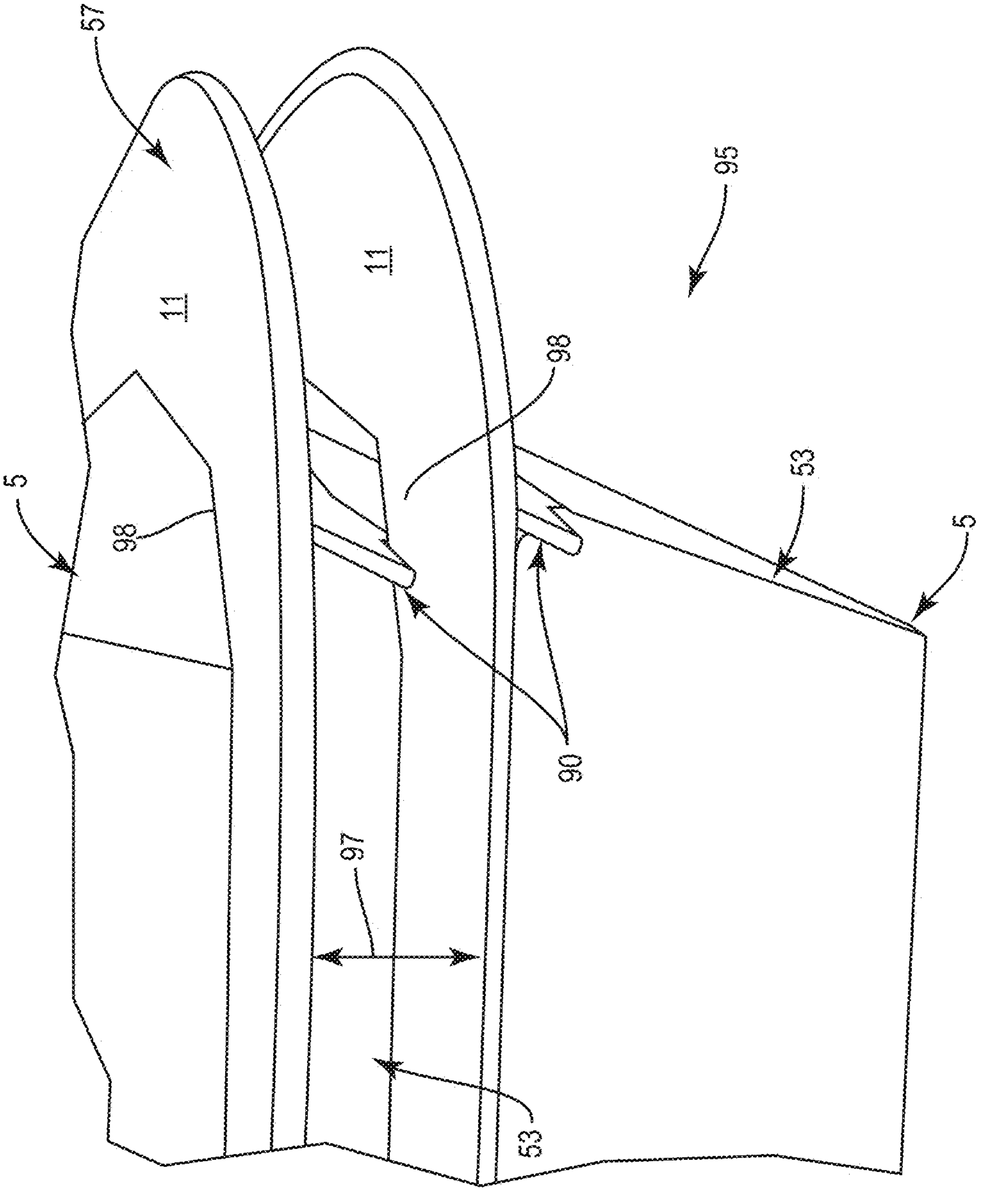
FIG. 6 is a detail view of a portion of the stacked arrangement of containers of FIG. 5.

As shown in FIGS. 5 and 6, the container 5 (broadly, "lower nested container" or "first upper nested container" or "second upper nested container") can be arranged with other containers 5 (broadly, "lower nested container" or "first upper nested container" or "second upper nested container") or another similar container in a nested or stacked arrangement 95, wherein the sidewall 53 and the bottom wall 55 of each container 5 is positioned at least partially in the interior 59 of a lower, nested container 5. In the illustrated embodiment, the shoulders 90 can extend downwardly from the flange 57 and outwardly from the sidewall 53 of each container 5 (e.g., from the respective corner flap 48) to form the denesting features. In such an arrangement, the shoulders 90 extend outwardly from the sidewall 53 from each of the corner flaps 48 adjacent the respective end panels 13, 17 the distance D1 and extend downwardly from the flange 57 a distance D2 (FIG. 5).

Accordingly, when the end panels 13, 17 of an upper container 5 are positioned adjacent the interior surfaces of the respective end panels 13, 17 of a lower nested container 5, the lateral edges 91 of the shoulders 90 extend outwardly from the sidewall 53 of the upper container 5 over the flange 57 of the lower container 5 and can rest on or contact the respective landing areas 98 of the flange 57 of the lower container 5. In the illustrated embodiment, the shoulders 90 can support the upper container 5 at the lateral edges 91 relative to the lower container 5 (e.g., the lateral edges 91 of the upper container can engage the upper surface of the central panel 11 at the landing areas 98 of the lower container) and can prevent the upper container 5 from moving farther into the interior 59 of the lower nested container 5. In some embodiments, the top edges 94*b* of the respective corner flaps 48 can at least partially contact and/or support a portion of the flange 57 of a vertically-adjacent container 5.

As shown in FIGS. 5 and 6, the shoulders 90 can form denesting gaps 97 between the flanges 57 of adjacent containers 5 in the stacked arrangement 95. In one embodiment, the height of each gap 97 can be equal to (e.g., approximately or substantially equal to) the distance D2.

In embodiments, the shoulders 90 can extend in the plane of the respective corner flaps 48, oblique with respect to the end panels 13, 17 and the side panels 21, 25, so that the shoulders 90 at each end of the container 5 extend outwardly and at least partially toward one another. In this regard, the side panels 21, 25 can at least partially define a respective plane and the respective corner flaps 48 and shoulders 90 extending therefrom can diverge from the respective plan.

For example, the oblique shoulders 90 can extend outwardly from the sidewall 53 a shorter distance than a similar shoulder extending in an orthogonal direction (e.g., if the corner flaps 48 were omitted and the shoulders 90 extended outwardly from the ends of the side panels 21, 25 in the plane of the side panels 21, 25). However, the landing areas 98 can extend along the end portions 47*c* of the edges 47 toward the interior 59 of the container 5 relative to the sidewall 53 (FIG. 3) to provide a larger engagement area for the shoulders 90 of another container 5 to contact when the containers are stacked than if the edges 47 continued in the direction of the corner portions 47*b* along the corner flaps 48 to the fold lines 15, 19.

In exemplary embodiments, the landing areas 98 can make stacking the containers 5 easier so that the shoulders more consistently engage the flanges 57 of respectively lower containers. In embodiments, the shoulders 90 could be positioned to extend farther outwardly from the sidewall 53 instead of or in addition to the use of the larger landing areas 98; however, such extended shoulders 90 can interfere with processing and/or handling equipment and can interfere with the handling of the blanks 3 and/or the constructs 51 and/or can interfere with the forming of the constructs 51 and/or the containers 5 in some embodiments. In embodiments, extending the shoulders 90 to compensate for the angle of the shoulders and the corner flaps 48 could require modifying sealing and lining tools and/or other apparatus to accommodate the larger shoulders, while extending the landing areas 98 towards the interior of the container 5 relative to the sidewall 53 can help compensate for the angle of the shoulders while allowing for the shoulders to be sized for use with existing tools. The stacked arrangement 95 and/or any of the shoulders 90 could be otherwise shaped, arranged, positioned, and/or configured without departing from the disclosure.

In exemplary embodiments, the denesting gaps 97 formed by the shoulders 90 in the stacked arrangement can facilitate separation of the containers 5 from the stacked arrangement 95 (e.g., denesting the containers 5). For example, if the shoulders 90 were omitted, the containers 5 could move farther into the interior 59 of the respectively lower containers 5 so that the flanges 57 of adjacent containers 5 can be positioned adjacent one another (e.g., the adjacent flanges 57 could be spaced by a small distance or in contact or engagement with one another). Without the denesting gap 97 formed by the shoulders 90, it can be more difficult to grasp the flanges 57 of the stacked containers 5 and pull the containers apart and/or it can be more difficult for a denesting apparatus (not shown) to move between two flanges 57 for separating the containers 5. In the illustrated embodiment, the denesting gap 97 can allow a user to more easily grasp the flange 57 of one of the containers 5 (e.g., the topmost container) and to pull the container 5 off the stacked arrangement 95 by its flange 57. Alternatively or in addition, the denesting gap 97 can provide space for a portion of a denesting device (not shown), such as a screw-type denesting device or other suitable device, to move between the flanges 57 of two adjacent containers 5 in the stacked arrangement 95 so that the denesting device may push the containers 5 apart at their flanges 57.

Figure 7:
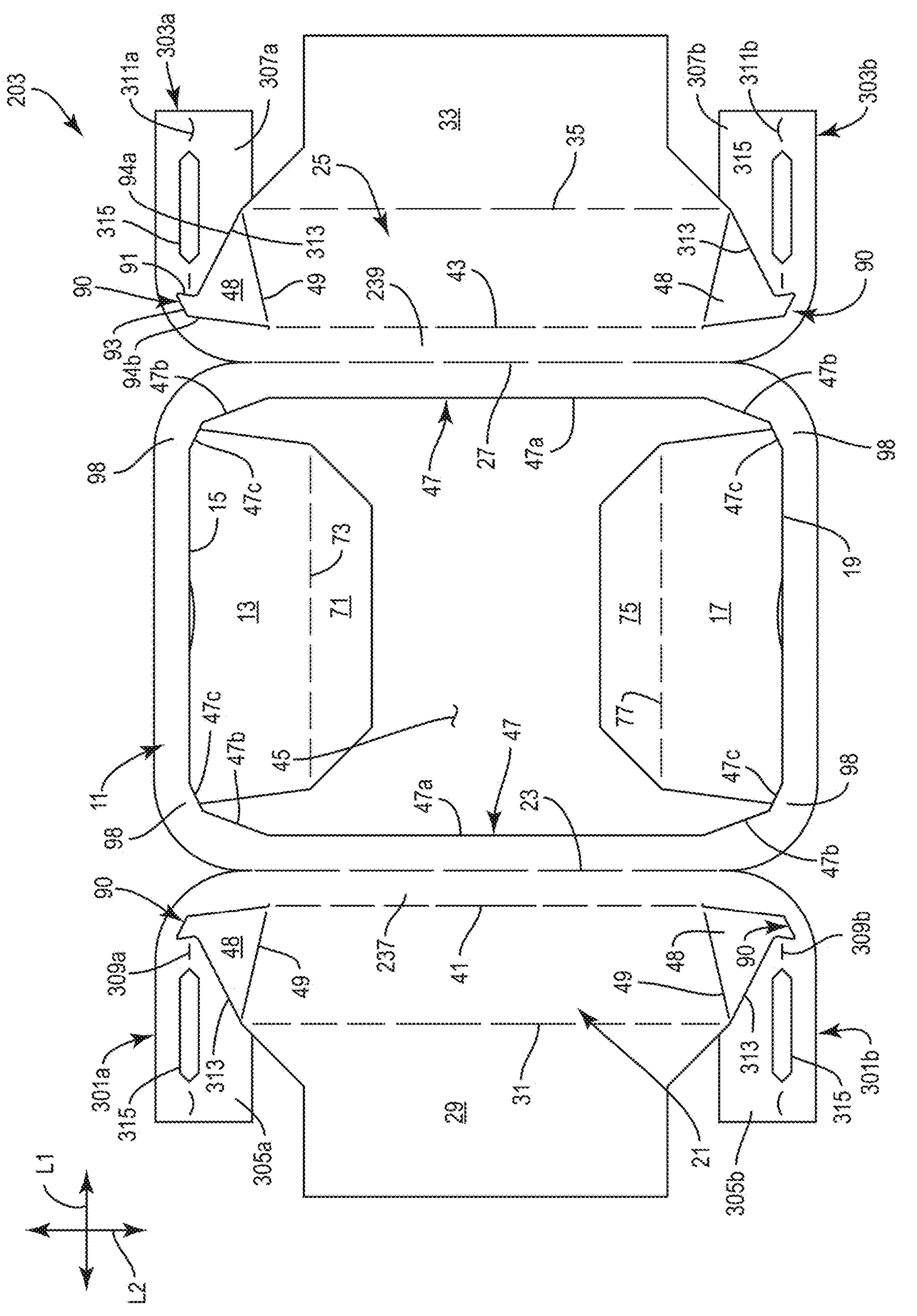
FIG. 7 is a plan view of a blank used for forming a container according to a second exemplary embodiment of the disclosure.

Turning to FIG. 7, a plan view of a blank 203 for forming a base layer 207 of a container 205 (FIGS. 8-10) according to a second embodiment of the disclosure is illustrated. The blank 203 and the container 205 formed therefrom can have one or more features that are the same or similar to those described above with respect to the blank 3 and the container 5, and like or similar features are designated with like or similar reference numerals.

As shown in FIG. 7, the blank 203 has a longitudinal direction L1 and a lateral direction L2 and the side panels 21, 25 can have attachment portions 237, 239 with extensions 301*a*, 301*b*, 303*a*, 303*b* extending beyond the edges of the side panels 21, 25 away from the central panel (e.g., in the longitudinal direction L1). As shown in FIG. 7, each of the extensions 301*a*, 301*b*, 303*a*, 303*b* can include a respective end reinforcement flap 305*a*, 305*b*, 307*a*, 307*b* foldably connected to the respective extension along a respective longitudinal fold line 309*a*, 309*b*, 311*a*, 311*b* for reinforcing the end panels 13, 17 when the container 205 is formed from the blank 203.

In the exemplary embodiments, the end reinforcement flaps 305*a*, 305*b*, 307*a*, 307*b* can be separable from at least the respective bottom panels 29, 33 and corner flaps 48 along respective lines of weakening 313 (e.g., cuts, slits, tear lines and/or other suitable features). In some embodiments, each of the end reinforcement flaps 305*a*, 305*b*, 307*a*, 307*b* can be at least partially connected to the respective bottom panels 29, 33 and/or corner flaps 48 by one or more nicks (not shown) or other suitable features, which can help keep the blank 203 flat until the nicks are broken to separate the end reinforcement flaps 305*a*, 305*b*, 307*a*, 307*b* from the respective bottom panels 29, 33 and/or corner flaps during formation of the base layer 207 of the container 205 from the blank 203.

In the illustrated embodiments, the corner flaps 48 and the shoulders 90 can be defined or at least partially defined by the respective lines of weakening 313 along the respective end reinforcement flaps 305*a*, 305*b*, 307*a*, 307*b* and extensions 301*a*, 301*b*, 303*a*, 303*b*. Alternatively, at least a portion of the bottom panels 29, 33, the corner flaps 48, and/or the shoulders 90 could be spaced apart from the extensions 301*a*, 301*b*, 303*a*, 303*b* and the end reinforcement flaps 305*a*, 305*b*, 307*a*, 307*b*.

As shown in FIG. 7, each of the extensions 301*a*, 301*b*, 303*a*, 303*b* can include a respective opening or slot 315 aligned with the respective fold lines 309*a*, 309*b*, 311*a*, 311*b*, which slots 315 can help prevent bunching of material as the end reinforcement flaps are folded in the erected container 205 as described in more detail below. The blank 203 could be otherwise shaped, arranged, positioned, and/or configured without departing from the disclosure.

Figure 9:
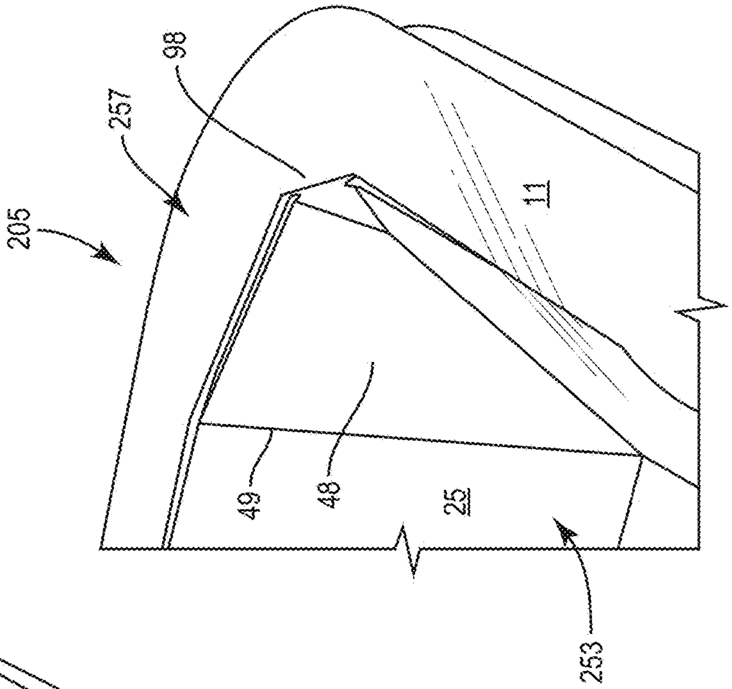
FIG. 9 is a detail view of respective corners of the stack of containers of FIG. 8.
Figure 8:
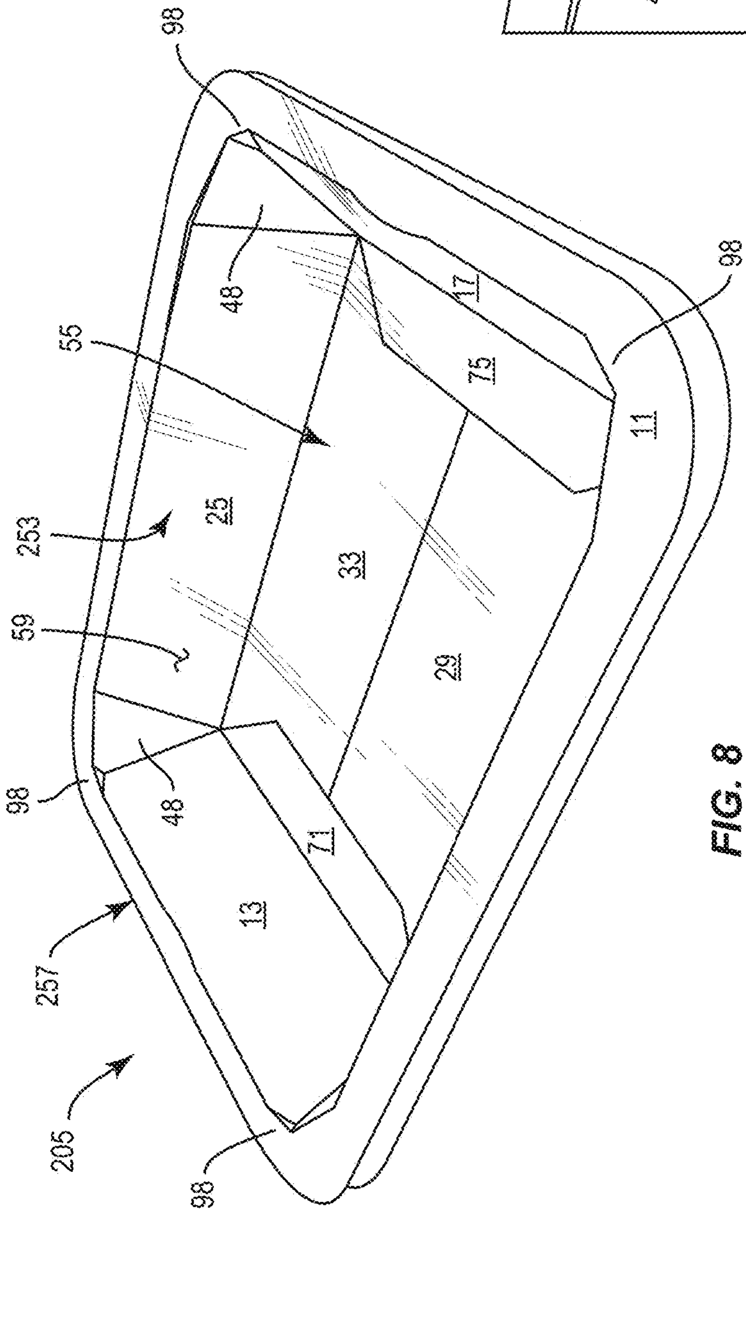
FIG. 8 is a top perspective view of a stacked arrangement of containers formed from the blank of FIG. 7 according to the second exemplary embodiment of the disclosure.
Figure 10:
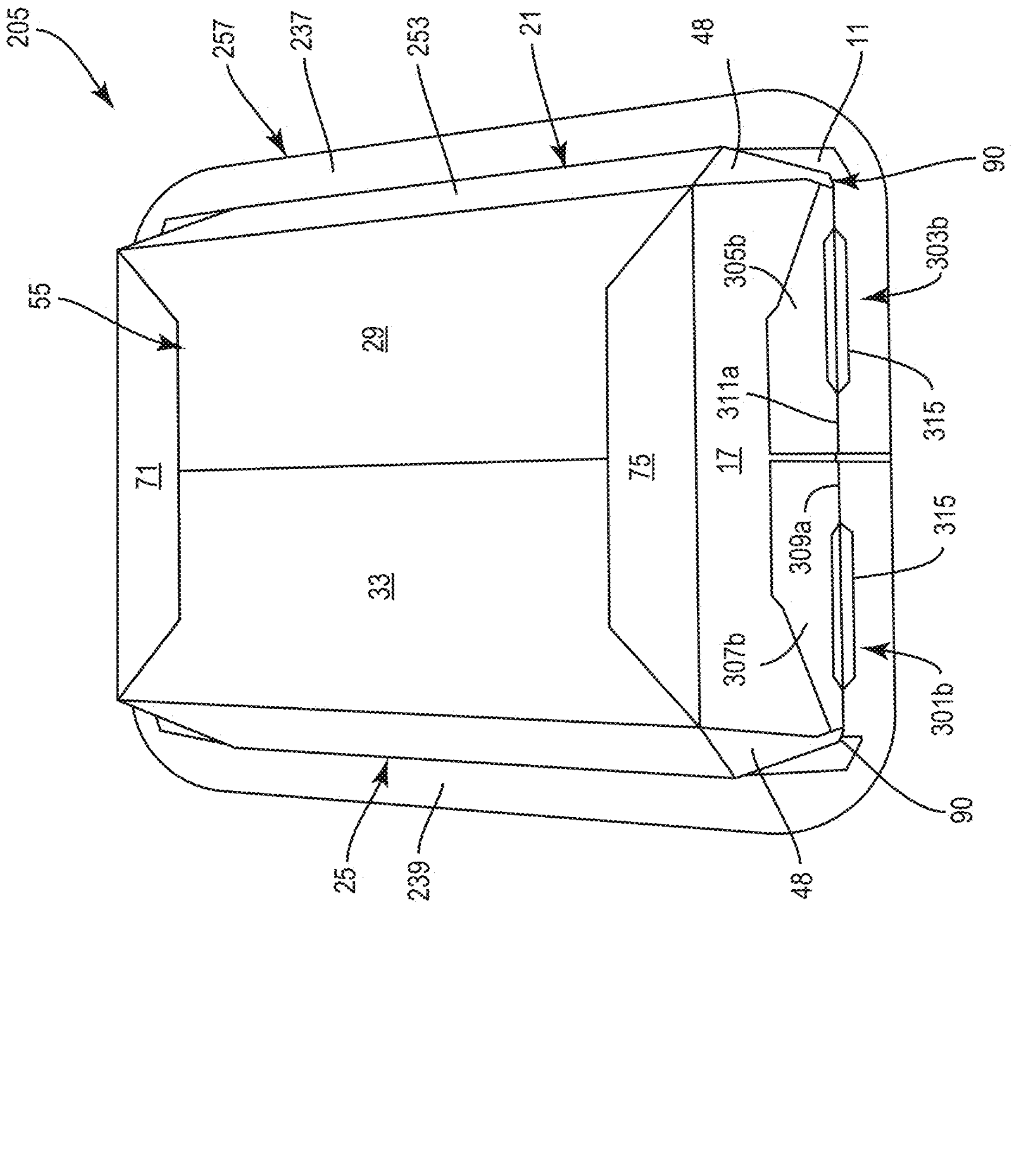
FIG. 10 is a bottom perspective view of the container of FIG. 8.

As shown in FIGS. 8-10, when the container 205 is formed from the blank 203, the end panels 13, 17 and the side panels 21, 25 extend generally downwardly from the central panel 11 to at least partially form a sidewall 253 extending around a perimeter of the bottom wall 55 formed from the bottom panels 29, 33, 71, 75.

The attachment portions 237, 239 with their extensions 301*a*, 301*b*, 303*a*, 303*b* can be folded under the central panel 11 when the side panels 21, 23 are positioned to form the sidewall 253. In the illustrated embodiment, the attachment portions 237, 239 and the extensions 301*a*, 301*b*, 303*a*, 303*b* can be glued to the underside of the central panel 11 so that the central panel 11, the attachment portions 237, 239, and portions of the extensions 301*a*, 301*b*, 303*a*, 303*b* cooperate to form a flange 257 of the container 205. In the illustrated embodiment, the attachment portions 237, 239 and the extensions 301*a*, 301*b*, 303*a*, 303*b* can reinforce the central panel 11 along the side panels 21, 23 and the end panels 13, 17.

The upper surface of the central panel 11 forms the upper surface of the flange 257 so that the upper surface of the flange 257 lacks joints, pleats, folds, creases, edges, and/or other features that can reduce the smoothness of the flange. This can help the flange 257 to provide a better surface for attaching the liner 9 to the base and/or for attaching a lid film to the flange 257. The liner can be similar or identical to the liner 9 of the first embodiment. In embodiments, a lid film or other cover for enclosing the interior 59 of the container 205 can form a tighter seal with the flange 257 than if the flange included pleats, joints, folds, creases, edges, and/or other features that can interfere with the formation of a seal between the cover and the flange.

The end reinforcement flaps 305*a*, 307*a* of the extensions 301*a*, 303*a* can be placed in face-to-face contact with the exterior surface of the first end panel 13 and the end reinforcement flaps 305*b*, 307*b* of the extensions 301*b*, 303*b* can be placed in face-to-face contact with the exterior surface of the second end panel 17. In embodiments, the end reinforcement flaps 305*a*, 305*b*, 307*a*, 307*b* can be glued or otherwise attached to the outer surfaces of the respective end panels 13, 17 and can reinforce the respective end panels 13, 17. Accordingly, the sidewall 253 of the container 205 can be strengthened by the end reinforcement flaps 305*a*, 305*b*, 307*a*, 307*b* extending along the respective end panels 13, 17 and can strengthen and increase rigidity of the container 205.

In embodiments, the extensions 301*a*, 303*a*, including the end reinforcement flaps 305*a*, 307*a*, can extend toward one another along the flange 257 and the sidewall 253 and the extensions 301*b*, 303*b*, including the end reinforcement flaps 305*b*, 307*b*, can extend toward one another along the flange 257 and the sidewall 253. In the illustrated embodiments, the distal ends of the extensions 301*a*, 303*a* can be proximate to one another and the distal ends of the extensions 301*b*, 303*b* can be proximate to one another so that there is a gap between the distal ends. In other embodiments, the distal ends can be brought together (e.g., can be proximate to one another and/or can abut/contact one another).

In exemplary embodiments, the extensions 301*a*, 301*b*, 303*a*, 303*b* and the end reinforcement flaps 305*a*, 305*b*, 307*a*, 307*b* can be glued to the underside of the central panel 11 and to the outer surface of the respective end panels 13, 17 when the blank 203 is formed into a flat construct (e.g., similar to the construct 51 of FIGS. 1A and 1B). In embodiments, the fold lines 309*a*, 311*a*, 309*b*, 311*b* of the respective extensions 301*a*, 303*a*, 301*b*, 303*b* can be on the inside of the folds when the end panels 13, 17 are folded downwardly from the central panel 11 along the respective fold lines 15, 19. The slots 315 in the extensions 301*a*, 301*b*, 303*a*, 303*b* can provide clearance to help avoid bunching of material on the inside of the folds when the end panels are folded downwardly.

The sidewall 253, the bottom wall 55, and/or the flange 257 could be omitted or could be otherwise shaped, arranged, positioned, and/or configured without departing from the disclosure. Further, the flange 257 can comprise one piece of board (e.g., the central panel 11) that has a top surface that extends around the perimeter of the container. The attachment portions 237, 239 and their extensions 301*a*, 301*b*, 303*a*, 303*b* glued to the central panel 11 strengthen the flange 257 and strengthen and increase rigidity of the container 205. In alternative embodiments, the attachment portions 237, 239 could be omitted without departing from the disclosure.

The container 205 could be made by the similar or same methods, process, systems, machines, etc. of any of the containers disclosed herein.

Any of the features of the various embodiments of the disclosure can be combined with, replaced by, or otherwise configured with other features of other embodiments of the disclosure without departing from the scope of this disclosure.

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

Any of the blanks, containers, or other constructs of this disclosure may optionally include one or more features that alter the effect of microwave energy during the heating or cooking of a food item that is associated with the tray or other construct. For example, the blank, tray, container, or other construct may be formed at least partially from one or more microwave energy interactive elements (hereinafter sometimes referred to as "microwave interactive elements") that promote heating, browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

In the case of a susceptor or shield, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

The use of other microwave energy interactive elements is also contemplated. In one example, the microwave energy interactive element may comprise a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Atlanta, GA) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas may be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. Nos. 5,412,187, 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

All dimensional information presented herein is intended to be illustrative of certain aspects, features, etc., of various embodiments of the disclosure, and is not intended to limit the scope of the disclosure. The dimensions of the blanks, containers, forming tools, features, or any other dimension, can be more or less than what is shown and described in this disclosure without departing from the scope of this disclosure and can be within the listed ranges of dimensions for each feature or outside the listed ranges of dimensions for each feature without departing from the scope of this disclosure.

The blanks according to the present invention can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blanks. The blanks may also be coated with, for example, a moisture barrier layer, on either or both sides of the blanks.

In accordance with the exemplary embodiments, the blanks may be constructed of paperboard of a caliper such that it is heavier and more rigid than ordinary paper. The blanks can also be constructed of other materials, such as cardboard, hard paper, or any other material having properties suitable for enabling the carton package to function at least generally as described above.

The foregoing description illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments. Additionally, the disclosure shows and describes only selected embodiments, but various other combinations, modifications, and environments are contemplated and are within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A container for holding a food product, the container comprising:

a flange comprising a central panel extending at least partially around a central opening;

a sidewall extending at least partially around an interior of the container, the sidewall comprising a plurality of panels foldably connected to the central panel;

at least one corner flap foldably connected to a respective panel of the plurality of panels, the at least one corner flap obliquely arranged relative to the respective panel of the plurality of panels; and denesting features comprising a denesting lug extending from the at least one corner flap and outwardly from the sidewall, the denesting lug positioned for engaging a nested container positioned below the container in a stacked arrangement such that the flange does not contact a flange of the nested container.

2. The container of claim 1, wherein the respective panel of the plurality of panels at least partially defines a plane, and the at least one corner flap diverges from the plane.

3. The container of claim 2, wherein the denesting lug at least partially defines an engagement edge extending from an oblique edge of the at least one corner flap and an end edge extending from the engagement edge to a top edge of the at least one corner flap.

4. The container of claim 3, wherein the engagement edge includes at least one straight segment and at least one oblique segment.

5. The container of claim 3, wherein the central panel at least partially defines at least one landing area adjacent the central opening for receiving a denesting lug of a nested container positioned above the container in a stacked arrangement.

6. The container of claim 5, wherein the central opening of the flange is at least partially defined by an interior free edge of the central panel, the interior free edge of the central panel comprises at least one oblique end segment, the at least one landing area positioned adjacent the at least one oblique end segment.

7. The container of claim 6, wherein the plurality of panels of the sidewall comprises a first side panel, a second side panel, a first end panel, and a second end panel each foldably connected to the central panel.

8. The container of claim 7, further comprising a bottom wall comprising a plurality of panels foldably connected to a respective panel of the plurality of panels of the sidewall, the plurality of panels of the bottom wall comprising a first bottom panel foldably connected to the first side panel, a second bottom panel foldably connected to the second side panel, a third bottom panel foldably connected to the first end panel, and a fourth bottom panel foldably connected to the second end panel.

9. The container of claim 8, further comprising a liner separably attached to at least a portion of the sidewall and at least a portion of the bottom wall.

10. A blank for forming a container for holding a food product, the blank comprising:

a central panel extending at least partially around a central opening for at least partially forming a flange of the container formed from the blank;

a plurality of panels foldably connected to the central panel for at least partially forming a sidewall extending at least partially around an interior of the container formed from the blank;

at least one corner flap foldably connected to a respective panel of the plurality of panels, the at least one corner flap for being obliquely arranged relative to the respective panel of the plurality of panels when the container is formed from the blank; and denesting features comprising a denesting lug extending from the at least one corner flap, the denesting lug for being positioned extending outwardly from the sidewall for engaging a nested container positioned below the container formed from the blank in a stacked arrangement such that the flange does not contact a flange of the nested container when the container is formed from the blank.

11. The blank of claim 10, wherein the respective panel of the plurality of panels at least partially defines a plane, and the at least one corner flap is for being positioned diverging from the plane when the container is formed form the blank.

12. The blank of claim 11, wherein the denesting lug at least partially defines an engagement edge extending from an oblique edge of the at least one corner flap and an end edge extending from the engagement edge to a top edge of the at least one corner flap.

13. The blank of claim 12, wherein the engagement edge includes at least one straight segment and at least one oblique segment.

14. The blank of claim 12, wherein the central panel at least partially defines at least one landing area adjacent the central opening for receiving a denesting lug of a nested container positioned above the container formed from the blank in a stacked arrangement.

15. The blank of claim 14, wherein the central opening of the flange is at least partially defined by an interior free edge of the central panel, the interior free edge of the central panel comprises at least one oblique end segment, the at least one landing area positioned adjacent the at least one oblique end segment.

16. The blank of claim 15, wherein the plurality of panels comprises a first side panel, a second side panel, a first end panel, and a second end panel each foldably connected to the central panel.

17. The blank of claim 16, wherein the plurality of panels further comprises a first bottom panel foldably connected to the first side panel, a second bottom panel foldably connected to the second side panel, a third bottom panel foldably connected to the first end panel, and a fourth bottom panel foldably connected to the second end panel, the first bottom panel, the second bottom panel, the third bottom panel, and the fourth bottom panel for at least partially forming a bottom wall of the container formed from the blank.

18. The blank of claim 17, further in combination with a liner for being separably attached to at least a portion of the sidewall of the container formed from the blank and at least a portion of the bottom wall of the container formed from the blank when the container is formed from the blank.

19. A method of forming a container for holding a food product, the container comprising:

obtaining a blank comprising a central panel extending at least partially around a central opening, a plurality of panels foldably connected to the central panel, the blank further comprising at least one corner flap foldably connected to a respective panel of the plurality of panels, and denesting features comprising a denesting lug extending from the at least one corner flap;

positioning the central panel to at least partially form a flange;

positioning the plurality of panels extending at least partially around an interior of the container; and positioning the at least one corner flap extending outwardly from the sidewall for engaging a nested container positioned below the container in a stacked arrangement such that the flange does not contact a flange of the nested container.

20. The method of claim 19, wherein the respective panel of the plurality of panels at least partially defines a plane, and the at least one corner flap diverges from the plane.

21. The method of claim 20, wherein the denesting lug at least partially defines an engagement edge extending from an oblique edge of the at least one corner flap and an end edge extending from the engagement edge to a top edge of the at least one corner flap.

22. The method of claim 21, wherein the engagement edge includes at least one straight segment and at least one oblique segment.

23. The method of claim 21, wherein the central panel at least partially defines at least one landing area adjacent the central opening for receiving a denesting lug of a nested container positioned above the container in a stacked arrangement.

24. The method of claim 23, wherein the central opening of the flange is at least partially defined by an interior free edge of the central panel, the interior free edge of the central panel comprises at least one oblique end segment, the at least one landing area positioned adjacent the at least one oblique end segment.

25. The method of claim 24, wherein the plurality of panels of the sidewall comprises a first side panel, a second side panel, a first end panel, and a second end panel each foldably connected to the central panel.

26. The method of claim 25, wherein the plurality of panels further comprises a first bottom panel foldably connected to the first side panel, a second bottom panel foldably connected to the second side panel, a third bottom panel foldably connected to the first end panel, and a fourth bottom panel foldably connected to the second end panel, and the method further comprises positioning the first bottom panel, the second bottom panel, the third bottom panel, and the fourth bottom panel at least partially forming a bottom wall of the container.

27. The method of claim 26, further comprising separably attaching a liner to at least a portion of the sidewall and at least a portion of the bottom wall.

28. A stacked arrangement of containers for holding a food product, the stacked arrangement comprising:

a lower nested container at least partially receiving an upper nested container, the upper nested container comprising:

a flange comprising a central panel extending at least partially around a central opening;

a sidewall extending at least partially around an interior of the container, the sidewall comprising a plurality of panels foldably connected to the central panel;

at least one corner flap foldably connected to a respective panel of the plurality of panels, the at least one corner flap obliquely arranged relative to the respective panel of the plurality of panels; and denesting features comprising a denesting lug extending from the at least one corner flap and outwardly from the sidewall, the denesting lug positioned for engaging the lower nested container positioned below the upper nested container in a stacked arrangement such that the flange does not contact a flange of the lower nested container.

29. The stacked arrangement of containers of claim 28, wherein the respective panel of the plurality of panels at least partially defines a plane, and the at least one corner flap diverges from the plane.

30. The stacked arrangement of containers of claim 29, wherein the denesting lug at least partially defines an engagement edge extending from an oblique edge of the at least one corner flap and an end edge extending from the engagement edge to a top edge of the at least one corner flap.

31. The stacked arrangement of containers of claim 30, wherein the engagement edge includes at least one straight segment and at least one oblique segment.

32. The stacked arrangement of containers of claim 30, wherein the central panel at least partially defines at least one landing area adjacent the central opening for receiving a denesting lug of a nested container positioned above the upper nested container in a stacked arrangement.

33. The stacked arrangement of containers of claim 32, wherein the central opening of the flange is at least partially defined by an interior free edge of the central panel, the interior free edge of the central panel comprises at least one oblique end segment, the at least one landing area positioned adjacent the at least one oblique end segment.

34. The stacked arrangement of containers of claim 33, wherein the upper nested container is a first upper nested container and the stacked arrangement of containers further comprises a second upper nested container, the at least one landing area of the first upper nested container at least partially receiving a denesting lug of the second upper nested container.

35. The stacked arrangement of containers of claim 33, wherein the plurality of panels of the sidewall comprises a first side panel, a second side panel, a first end panel, and a second end panel each foldably connected to the central panel.

36. The stacked arrangement of containers of claim 35, further comprising a bottom wall comprising a plurality of panels foldably connected to a respective panel of the plurality of panels of the sidewall, the plurality of panels of the bottom wall comprising a first bottom panel foldably connected to the first side panel, a second bottom panel foldably connected to the second side panel, a third bottom panel foldably connected to the first end panel, and a fourth bottom panel foldably connected to the second end panel.

37. The stacked arrangement of containers of claim 36, further comprising a liner separably attached to at least a portion of the sidewall and at least a portion of the bottom wall.

* * * * *